Jan. 25, 1966 H. B. COLLINS, JR., ETAL 3,231,672

TRANSMISSION SYSTEM FOR STEREOPHONIC SIGNALS

Filed Oct. 20, 1958 2 Sheets-Sheet 1

INVENTORS
HAROLD B. COLLINS, JR.
DERIL T. WEBB
BY
Robert D. Sanborn
ATTORNEY

TRANSMISSION SYSTEM FOR STEREOPHONIC SIGNALS

Filed Oct. 20, 1958 2 Sheets-Sheet 2

INVENTORS
HAROLD B. COLLINS, JR.
DERIL T. WEBB
BY
Robert D. Sanborn
ATTORNEY

United States Patent Office 3,231,672
Patented Jan. 25, 1966

3,231,672
TRANSMISSION SYSTEM FOR STEREOPHONIC SIGNALS

Harold B. Collins, Jr., Wayne, and Deril T. Webb, Norristown, Pa., assignors, by mesne assignments, to Philco Corporation, Philadelphia, Pa., a corporation of Delaware Filed Oct. 20, 1958, Ser. No. 768,386
1 Claim. (Cl. 179—15)

The present invention relates to signal broadcasting systems and more particularly to systems for broadcasting two separate stereophonic program signals over a single amplitude modulation radio channel using only one carrier frequency.

It is known that two stereophonic program signals may be broadcast over a single amplitude modulation channel by modulating the respective program signals on separate, quadrature phased carrier signals and then linearly combining the modulated carrier signals to produce a single resultant carrier signal while retaining the four sideband signals. This system has the advantage over other forms of stereophonic broadcasting systems that it can be received without appreciable loss of intelligence by a conventional monaural amplitude modulation receiver. This permits existing radio stations to adopt this form of stereophonic broadcasting for all programs without interrupting their service to listeners who are not equipped with stereophonic receivers. We have discovered, however, that under certain conditions of operation of the stereophonic broadcasting system just described, the signal provided by the monaural receiver employing the usual amplitude detector may include a relatively high percentage of distortion.

Therefore it is an object of the present invention to provide an improved system for broadcasting stereophonic program signals which retains the advantages of the quadrature phased carrier system while greatly reducing the distortion present in the monaural reception of this signal.

It is a further object of the present invention to provide a system for broadcasting stereophonic program signals over a single amplitude modulation channel which reduces the distortion present in monaural reception of the signal without materially reducing the signal-to-noise ratio for stereophonic reception.

Still another object of the present invention is to provide an improved system for stereophonic broadcasting which requires only minor modification of stereophonic receivers designed for the reception of quadrature phased carrier signals.

These and other objects of the present invention are achieved by providing a system in which the two stereophonic information signals are modulated on carriers having a phase difference of appreciably less than a quarter cycle at the carrier frequency. Means are provided for linearly combining the modulated carrier signals to provide a single resultant carrier signal and four associated sidebands.

For a better understanding of the present invention together with other and further objects thereof reference should now be made to the following detailed description which is to be read in conjunction with the accompanying drawings in which.

Figure 1:
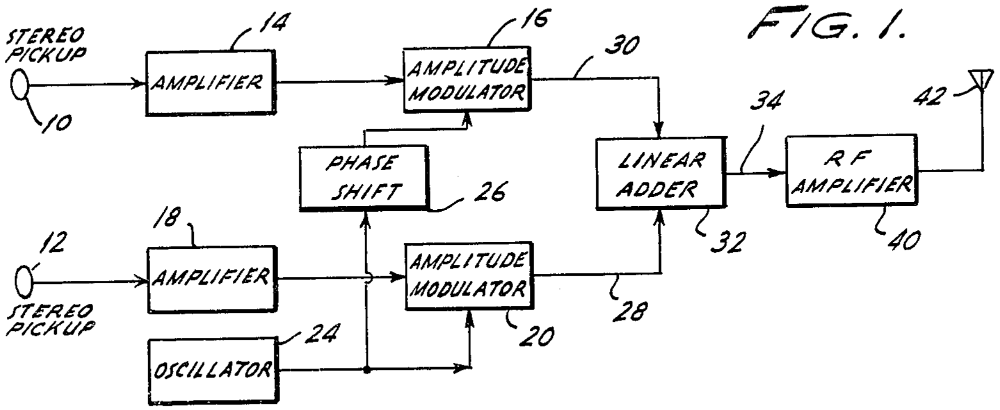
FIG. 1 is a block diagram of a broadcasting system arranged in accordance with the present invention.

The system shown in FIG. 1 includes two stereophonic pick-ups 10 and 12 which generate the two stereophonic information signals which are to be conveyed to the receiving locations. Stereophonic pick-ups 10 and 12 may be two microphones spaced an appropriate distance apart to pick-up differently phased signals from an orchestra or the like or they may comprise, for example, the two signal pick-up elements of a stereophonic phonograph or tape reproducer. The signal from pick-up 10 is supplied through an amplifier 14 to an amplitude modulator circuit 16. The signal from stereophonic pick-up 12 is supplied through an amplifier 18 to a second amplitude modulator circuit 20. Modulator 20 is supplied with a carrier signal from a carrier oscillator 24. The signal from carrier oscillator 24 is also supplied to amplitude modulator 16 through a phase shifter 26. Phase shifter 26 provides an effective phase difference of less than one-quarter cycle of the carrier frequency for the signals at the carrier signal inputs to modulators 16 and 20. The signals on output connections 28 and 30 of modulators 20 and 16, respectively, are linearly combined in adder circuit 32. The resultant signal appearing on output connection 34 of adder circuit 32 is supplied through a suitable radio frequency amplifier 40 to the transmitting antenna 42. Radio frequency amplifier 40 may include further heterodyning circuits for increasing the frequency of the signal supplied thereto to the appropriate radio frequency channel assigned to the radio station.

Figure 2:
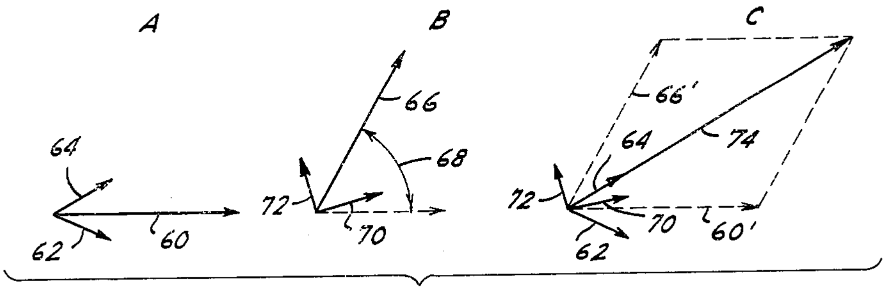
FIG. 2 is a series of vector diagrams showing the phase and amplitude relationships of the signals present at various points in the system of FIG. 1.

Turning now to FIG. 2, vector 60, shown at A, represents the carrier frequency signal supplied to modulator 20 from oscillator 24. It also can be taken as representing the phase of the carrier component appearing at output lead 28 since there is a fixed relationship between the phase of the output carrier component appearing at output lead 28 and the phase of the carrier signal supplied to the input of modulator 20. Vectors 62 and 64 represent the sideband components generated by modulator 20 in response to the application of the information signal from amplifier 18.

Vector 66, shown at B in FIG. 2, represents the phase of the carrier signal supplied to the input of modulator 16 from phase shifter 26 and it also represents the phase of the carrier component on output lead 30. The angle 68 in FIG. 2 is equal to the net difference in the phase shifts provided by the coupling circuits between oscillator 24 and modulators 20 and 16, respectively. Vectors 70 and 72 represent the sideband components generated by modulator 16 in response to the application of the information signal from amplifier 14. Preferably modulators 16 and 20 are so arranged that the average output carrier amplitude is approximately the same for modulator 16 as it is for modulator 20.

Vector 74, shown at C in FIG. 2, represents the resultant carrier frequency component which will appear at the output 34 of linear adder 32. Vector 74 represents the addition of vectors 60′ and 66′ which correspond to vectors 60 and 66, respectively, shown at A and B in FIG. 2. The signal at output connection 34 will also include the four sideband components 62, 64, 70 and 72 which correspond in amplitude and phase to the similarly identified vectors shown at A and B in FIG. 2. It should be noted that the relative phase positions of these sideband vectors do not change as a result of the linear addition in circuit 32.

The vector diagram shown at C in FIG. 2 will remain the same even though the signal at output connection 34 is heterodyned one or more times to increase or decrease its frequency. Therefore the vector diagram at C in FIG. 2 represents the signal at transmitting antenna 42 and also the signal present at the output of the intermediate frequency amplifier of a superheterodyne radio receiver tuned to the transmitting station of FIG. 1.

Figures 3, 4, 5:
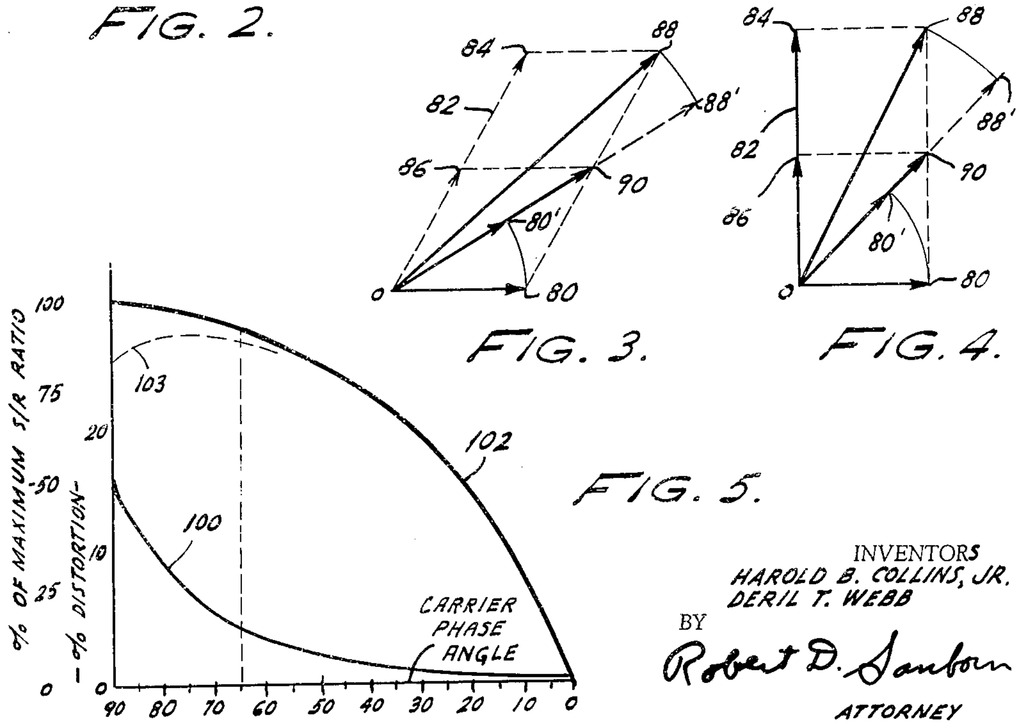
FIG. 3 is a vector diagram showing the phase and amplitude relationships of signals provided by the system of the present invention under a selected condition of operation of the system.
FIG. 4 is a vector diagram showing the phase and amplitude relationships of signals provided by a quadrature phased carrier system for the condition of operation assumed in FIG. 3.
FIG. 5 is a graph showing the signal-to-noise ratio for stereophonic reception as a function of phase angle between the original carrier signals and also the distortion present in monaural reception as a function of phase angle between the original carrier signals.

FIG. 3 is a vector diagram which represents the signals which will be received by a monaural receiver tuned to the broadcasting station of FIG. 1 for one condition of operation of the system of FIG. 1. The condition assumed in the vector diagram of FIG. 3 is that no signal is being supplied by stereophonic pick-up 12 and that the signal supplied by stereophonic pick-up 10 is of sufficient amplitude to produce 100% modulation of the carrier signal in amplitude modulator circuit 16. Since no signal is being picked up by stereophonic pick-up 12, the output signal of modulator 20 may be represented by a vector 80 of unit length. Since the carrier signal is being 100% modulated in circuit 16 it can be represented by a vector 82 which has an amplitude of two units as shown at 84 on positive peaks of modulation and an amplitude of zero on the negative peaks of the modulation. The average value of the carrier signal is represented by the vector 86 of unity length. It will be understood by those skilled in the art that the representation of the signal from modulator 20 as a vector of variable length is equivalent to the showing at B in FIG. 2 of the same signal as a vector of fixed length with two counter-rotating sideband vectors of equal length. The resultant signal appearing at output connection 34 of linear adder 32 will be a vector which varies in length from the unity value represented by vector 80 on the negative peaks of the modulation of the signal from stereophonic pick-up 10 to a value represented by vector 88 on the positive peaks of the modulating signal supplied to circuit 16. The amplitude of the carrier as the modulating signal from stereophonic pick-up 10 is passing through zero will be as shown at 90 which is the resultant of vectors 80 and 86.

It can be seen from FIG. 3 that the signal at the output of linear adder 32 is amplitude modulated from the value 80 to the value 88 and is also frequently modulated as represented by the difference in phase angle between vector 80 and vector 88. An amplitude detector of the type normally employed in conventional amplitude modulation broadcast receivers will detect the amplitude modulation of the resultant signal but will not respond to the frequency modulation of this signal. That is, the audio output signal from the amplitude detector of a monaural receiver will vary from the value 80 shown in FIG. 3 to the value 88, having a zero signal level as shown at 90. The vector 80 has been rotated to the position 80′ on vector 90 and the vector 88 has been rotated to the position 88′ on the extension of vector 90 to show that the negative peaks of the detected signal which are represented by the distance 90–80′ is substantially equal to the amplitude of the positive peaks of the detected signal as represented by the distance 90–88′. Thus it has been shown that, for the conditions assumed, a conventional monaural amplitude modulation receiver will receive the signal from the transmitting station of FIG. 1 with relatively little distortion. It can be shown that the distortion will be even less if the signal present on stereophonic pick-up 10 produces less than 100% modulation of the carrier component in modulator 16 and/or if the signal on pick-up 10 is not zero but is equal to some fraction of the signal on stereophonic pick-up 12.

FIG. 4 is a vector diagram representing the reception of a quadrature phased stereophonic broadcast signal under the conditions assumed in FIG. 3, that is with zero signal received by pick-up 12 and a signal on pick-up 10 of sufficient amplitude to produce 100% modulation in modulator circuit 16. Vectors in FIG. 4 corresponding to similar vectors in FIG. 3 have been identified by the same reference numerals. It can be seen from an inspection of FIG. 4 that the distance 80′–90 in FIG. 4 is much less than the distance 90–88′ in this same figure. This indicates that the negative peaks of the audio signal output of an amplitude detector in a monaural amplitude modulation receiver tuned to receive a quadrature phased carrier stereophonic signal will be smaller than the positive peaks of the signal in this receiver. This flattening of the negative peaks is equivalent to the introduction of even order harmonic distortion. It can be shown that, under the conditions asumed in FIG. 4, the second harmonic distortion amounts to about 16% of the amplitude of the desired signal.

Curve 100 in FIG. 5 is a plot of the percentage distortion in the signal at the output of monaural receiver under the conditions assumed in vector diagrams 3 and 4 as a function of the phase angle between the reference carriers supplied to modulators 16 and 20, respectively. The condition assumed for curve 100 is that a signal on one input, for example input 10 is sufficient to produce 100% modulation of the carrier signal supplied to modulator 16 and that zero signal is supplied to input 12. It will be noted that the distortion decreases rapidly as the phase angle between the two reference carriers decreases and is down approximately 10 db. for a phase angle of 65°.

Curve 102 in FIG. 5 represents the decrease in signal-to-noise ratio in the stereophonic receiver as the angle between the carrier signals is decreased. The signal-to-noise ratio at the quadrature phased condition is taken as the reference. It can be shown that curve 102 is a cosine function which decreases relatively slowly for angles close to 90° and then falls off more rapidly as the angle between the carriers approaches zero. It can be shown also that the signal-to-noise ratio is down less than one db. for a phase angle of 65°. Therefore, as shown by the two curves 100 and 102 of FIG. 5, a phase angle of less than 90° between the reference carrier signals will permit greatly improved reception on monaural receivers without appreciably degrading the reception on stereophonic receivers.

Figure 6:
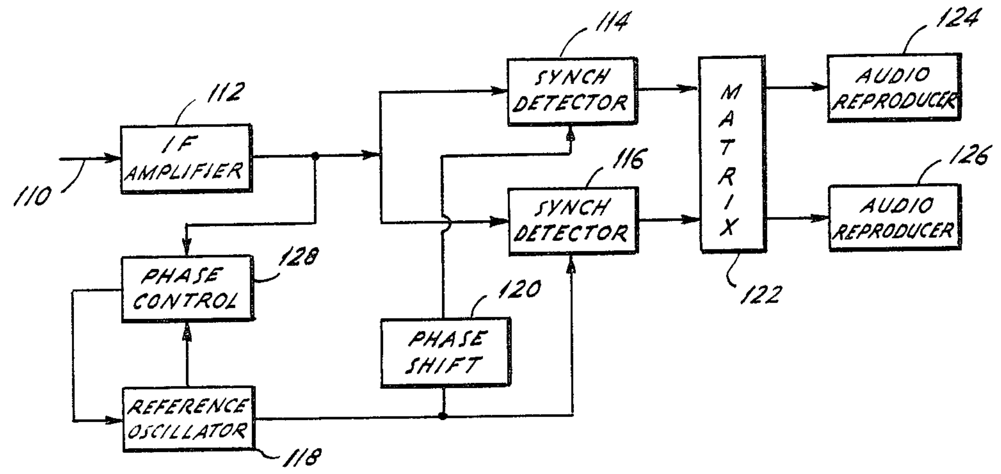
FIG. 6 is a block diagram of a portion of a superheterodyne receiver which may be employed to detect the signals broadcast by the system of FIG. 1.

FIG. 6 is a block diagram of a portion of a superheterodyne receiving system for the single carrier stereophonic signals broadcast by the circuit of FIG. 1. The radio frequency and mixer portions of the superheterodyne receiver may be conventional and, for this reason, are not shown in FIG. 6. The intermediate frequency signals from the mixer (not shown) are supplied by way of input connection 110 to intermediate frequency amplifier 112. The output signals of intermediate frequency amplifier 112 are supplied to two synchronous detectors 114 and 116. A reference oscillator 118 supplies demodulating reference signals to synchronous detectors 114 and 116. Means are provided for causing the phase of the reference oscillator signal supplied to detector 114 to be different from the phase of the reference oscillator signal supplied to detector 116. In FIG. 6 this means is represented by the phase shifter 120 in the connection between oscillator 118 and modulator 114.

The audio signals present in the output of synchronous detectors 114 and 116 are supplied through a matrix circuit 122 to audio reproducers 124 and 126. A phase control circuit 128 receives input signals from reference oscillator 118 and from the output of intermediate frequency amplifier 112. The phase control circuit 128 supplies a phase control signal to oscillator 118 which causes the output signal of oscillator 118 to have a phase which is fixed with respect to the phase of the average carrier signal at the output of intermediate frequency amplifier 112. A receiver of the type shown in FIG. 6 is described in detail in the copending application of Harold B. Collins, Jr., Serial No. 768,206, filed October 20, 1958, now Pat. No. 3,043,914.

Figure 7:
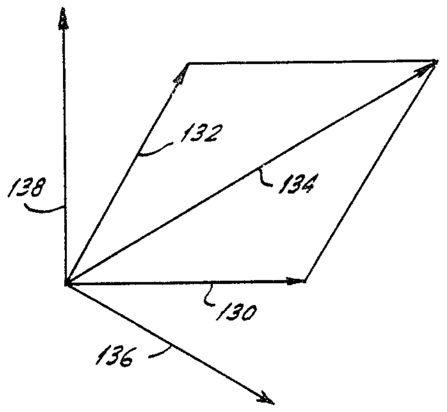
FIG. 7 is a vector diagram illustrating one mode of operation of the receiver of FIG. 6.

Turning now to the vector diagram of FIG. 7, vector 130 represents the apparent phase position at the receiver of one reference carrier signal at the transmitting station. Vector 132 represents the apparent phase position at the receiver of the second carrier signal at the transmitting station. Vector 134 represents the single resultant carrier signal which is broadcast and which appears at the output of intermediate frequency amplifier 112. It can be seen that, if the signal supplied by reference oscillator 118 to synchronous detector 116 has a phase as shown by vector 136 which is in quadrature with vector 132, synchronous detector 116 will provide an output indicative of the modulation present on vector 130 but will not produce any output signal resulting from modulation present on vector 132. Similarly, if the reference signal supplied to synchronous detector 114 is in phase quadrature with the original carrier vector 130 as shown by vector 138, detector 114 will provide an output signal indicative of the modulation present on vector 132 but will not respond to any modulation present on vector 130.

If the demodulating reference signals supplied to detectors 114 and 116 have phases as shown by vectors 136 and 138, matrixing circuit 122 is not necessary and the output signal from detector 114 may be supplied directly to audio reproducer 124. Similarly, the signal from synchronous detector 116 may be supplied directly to audio reproducer 126.

It is now apparent that receivers for quadrature phased carrier component stereophonic signals which are generally similar to the circuit of FIG. 6 may be converted for the reception of signals having non-quadrature phased carrier components merely by changing the constants of the phase shift circuits which connect the reference oscillator to the synchronous detectors.

Figure 8:
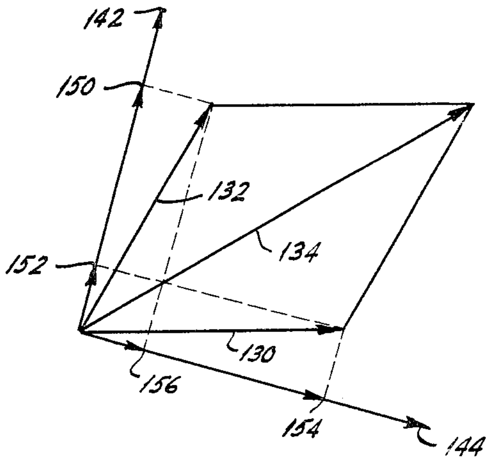
FIG. 8 is still another vector diagram indicating a second possible mode of operation of the receiver system of FIG. 6.

If the signals represented by vectors 130, 132 and 134 are supplied to a receiver of the type shown in FIG. 6 in which the reference signal supplied to detectors 114 and 116 are in phase quadrature as represented by vectors 142 and 144 of FIG. 8, it will be seen that synchronous detector 114 will provide an output signal having one component 150 resulting from the amplitude modulation present on vector 132 and a second component represented by vector 152 resulting from the modulation present on vector 130. Similarly, the output of synchronous detector 116 will include a component 154 representing the modulation present on vector 130 and a second component 156 representing the modulation present on vector 132. Vectors 152 and 156 represent undesirable cross-talk between the two stereophonic channels. This cross-talk can be eliminated by passing the signals from synchronous detectors 114 and 116 through matrixing circuit 122. Since vector 152 is approximately ¼ the amplitude of vector 154, if the signal represented by vectors 154 and 156 is passed through an attenuator having an attenuation ratio of four to one and is then subtracted from the signal represented by vectors 152 and 150, the resultant signal will be a signal which may be represented by vector 150 reduced by ¼ the amplitude of vector 156. Since both vectors 150 and 156 result from the modulation present on vector 132, the output of the subtractor contains no cross-talk and the amplitude of the desired signal is reduced only slightly. Similar means may be employed for eliminating the cross-talk in the other channel of the stereophonic system. The matrixing in circuit 122 may be accomplished through the use of transformer windings or resistive networks in any well known manner.

Turning once again to the circuit of FIG. 5, if the curve 100 is reduced to the same scale as curve 102 and then subtracted from 102, a third curve 103 will be produced which is a measure of the performance of both the stereophonic receiver and the monaural receiver as the phase angle between the two reference carriers supplied to modulators 16 and 20 of FIG. 1 is varied. It can be shown that curve 103 rises to a maximum for a phase angle of approximately 75° between the two reference carrier signals. Therefore a phase angle of approximately 75° between the carrier signals supplied to modulators 16 and 20 represents an optimum compromise between signal-to-noise ratio in a stereophonic receiver and the amount of distortion which will be present in a monaural receiver employing an envelope detector.

While the invention has been described with reference to a single embodiment thereof, it will be apparent that various modifications and other embodiments thereof will occur to those skilled in the art within the scope of the invention. Accordingly we desire the scope of our invention to be limited only by the appended claim.

What is claimed is:

A system for broadcasting first and second stereophonic program signals, said system comprising means for amplitude modulating a first carrier wave with said first program signal, means for amplitude modulating a second carrier wave with said second program signal, means for linearly combining said modulated carrier waves, said first and second carrier waves having the same average amplitude and the same freqeuncy but differing in average phase at the input of said combining means by more than 55° and less than 75°, and means for transmitting said combined signal to remotely placed receivers.

References Cited by the Examiner

UNITED STATES PATENTS

| | | | |
|---|---|---|---|
| 1,608,566 | 11/1926 | Potter | 325—36 |
| 1,666,158 | 4/1928 | Affel. | |
| 2,698,379 | 12/1954 | Boelens et al. | |
| 2,920,138 | 1/1960 | Fogel. | |
| 2,942,070 | 6/1960 | Hammond et al. | |

OTHER REFERENCES

Aiken: Article Proc. of the I.R.E. September 1933, pp. 1265–1301.

Color Television Fundamentals by Kiver, copyright 1955, by McGraw-Hill, pp. 46 and 50.

DAVID G. REDINBAUGH, *Primary Examiner.*

GEORGE N. WESTBY, STEPHEN W. CAPELLI, *Examiners.*